Dec. 1, 1925.
E. H. WILLIAMS
STORAGE BATTERY
Filed April 21, 1925
1,564,163
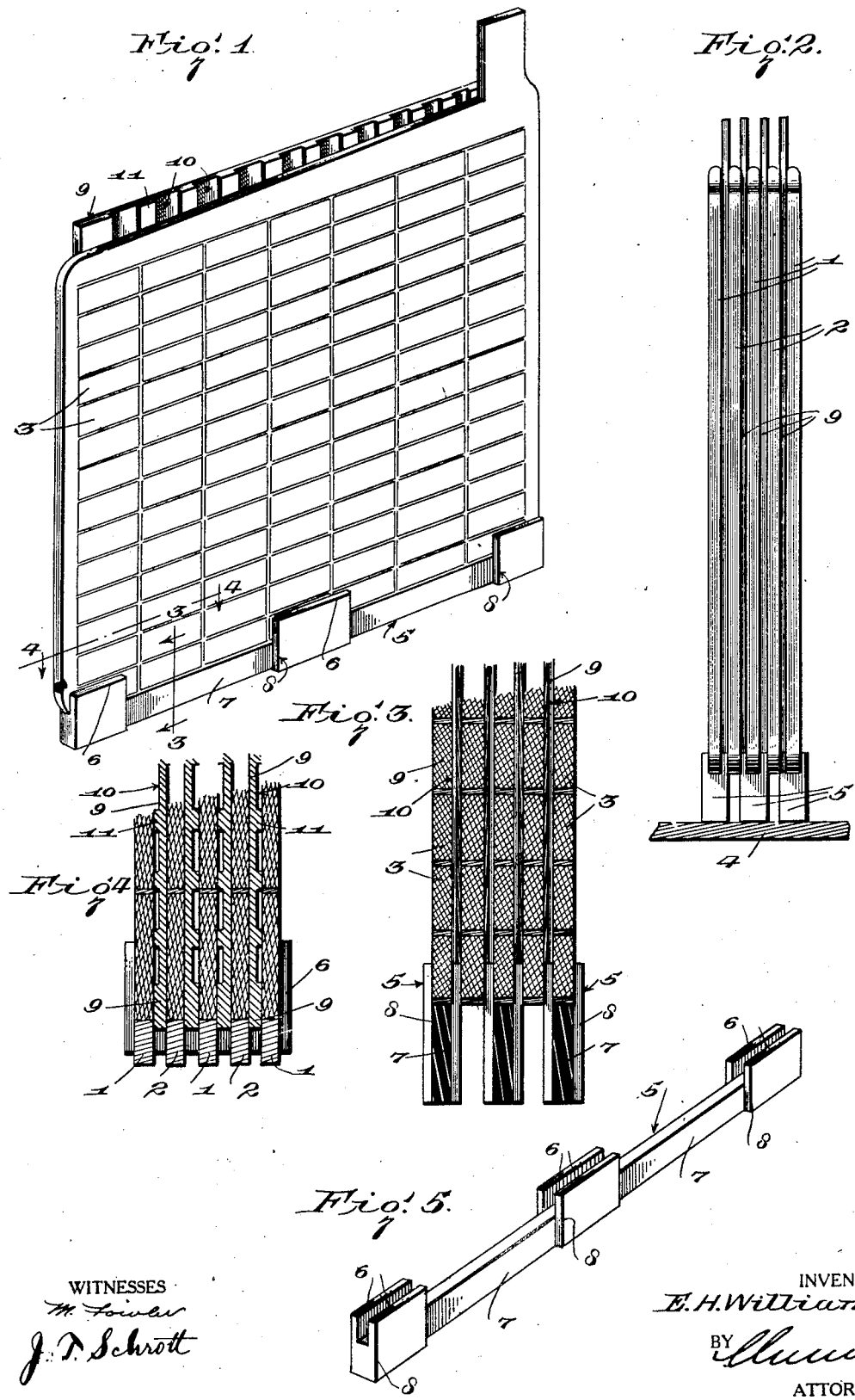

Patented Dec. 1, 1925.

1,564,163

UNITED STATES PATENT OFFICE.

ELMER HOWARD WILLIAMS, OF MONESSEN, PENNSYLVANIA.

STORAGE BATTERY.

Application filed April 21, 1925. Serial No. 24,843.

*To all whom it may concern:*

Be it known that I, ELMER HOWARD WILLIAMS, a citizen of the United States, and resident of Monessen, in the county of Westmoreland and State of Pennsylvania, have invented certain new and useful Improvements in Storage Batteries, of which the following is a specification.

This invention relates to improvements in storage batteries and it consists of the constructions, combinations and arrangements herein described and claimed.

An object of the invention is to provide a spacer to be attached to each of the positive plates of a storage battery, its function being to hold the plate spaced from the bottom of the jar and to provide room for the accumulation of active material that falls from the plate in the course of time.

Another object of the invention is to provide an improved separator to be used between plates.

Other objects and advantages appear in the following specification, reference being had to the accompanying drawing in which:

Figure 1 is a perspective view of a positive storage battery plate showing the spacer attached.

Figure 2 is an end elevation of a number of positive and negative plates illustrating the use of both spacers and separators.

Figure 3 is a detail vertical section on the line 3—3 of Fig. 1.

Figure 4 is a detail horizontal section on the line 4—4 of Fig. 1.

Figure 5 is a detail perspective view of one of the positive plate spacers.

As is commonly known a storage battery contains a plurality of plates 1 and 2 of respectively positive and negative sign. These plates are ordinarily of the Faure type, in which the active material 3 is applied in the grids while in paste form. This material falls out from time to time, particularly from the positive plates, accumulating at the bottom of the jar or container 4 (Fig. 2).

The spacers 5 are slipped upon the bottom edges of the positive plates 1 to hold them an appropriate distance from the jar bottom. Active material collecting between plates must reach considerable proportions before any damage by short-circuiting is likely to occur.

A plurality of slotted heads 6 occur along the bar 7 (Fig. 5) one at each end and one in the center. Obviously the distribution may be otherwise. The heads extend above the bar 7 and the slots in the heads begin at the top surface of the bar. The top of the bar constitutes the bottom of the slots, and the width of the slots equals the thickness of the bar 7. This causes the sides 8 of the heads to stand out from the bar producing channels into which the falling active material can drop. The outstanding portions of the heads provide lateral spacers which keep the plates from short-circuiting when becoming buckled (Figs. 1, 2 and 3).

In manufacture the spacer is formed from a single piece of rubber or other insulating material. The depressions between the heads 6 are either cut or molded in.

Use is also made of a novel form of separator 9. The separator is made of a thin plate of wood, grooved at 10 to leave outstanding ribs 11. The upright grooves coact in function with that of the spacer channels to the extent that they permit passage of the falling active material.

As shown in Figs. 2 and 3 the separators 9 come to the top of the heads 6 of the spacers 5 and not to the bottom of the plates themselves as is usual in storage batteries. In use, the spacers 5 and separators 9 are assembled substantially as in Figs. 2 and 3. The bottom edges of the positive and negative plates 1 and 2 are about even. The sides of the slotted heads 6 extend up the sides of the positive plates 1 and serve as lateral spacers between positive and negative plates.

The separators 9 extend down to the top of the heads 6 insuring that the various plates shall be kept apart. The grooves 10 run vertically, and as active material falls off of the plates it settles in the channels betwen the spacers.

While the construction and arrangement of the improved spacer and separator is that of a generally preferred form, obviously modifications and changes may be made without departing from the spirit of the invention or scope of the claims.

I claim:

1. In combination with the plate of a storage battery, a spacer comprising a bar extending along the bottom edge of the plate to support it above the bottom of a battery container, and heads on the bar having slots in which the edge of the plate is fitted, said heads being in outstanding relationship to the sides of the plate and bar providing channels when two or more spacers are assembled in which active material falling from the plates may collect.

2. A spacer for storage battery plates comprising an insulating bar, a plurality of heads on the bar extending above the bar and being slotted downwardly to the top of the bar the width of the slots being equal to the thickness of the bar, said heads therefore standing out from the sides of the bar forming channels when two or more spacers are assembled.

3. In combination with a plurality of storage battery plates, spacers at the bottom edges of alternate ones of the plates, heads on said bars being slotted to receive said plates and provide lateral spacers between adjoining plates preventing short-circuiting of plates upon buckling and providing channels for the collection of falling active material, and separators extending between the plates upward from said heads being grooved to communicate with said channels to conduct said falling material thereinto.

ELMER HOWARD WILLIAMS.